Jan. 11, 1927.
J. VAN H. WHIPPLE
1,614,417
AUXILIARY HAND GRIP FOR STEERING WHEELS
Filed Jan. 9, 1926
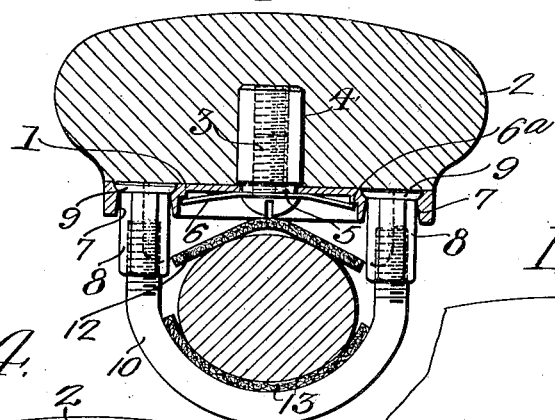
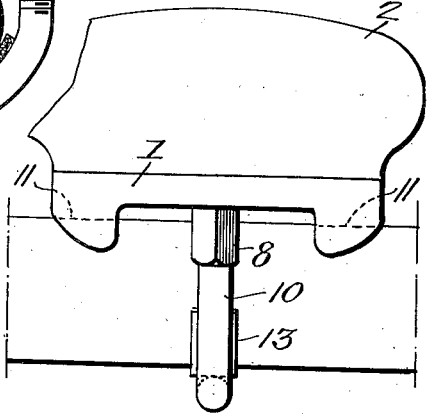
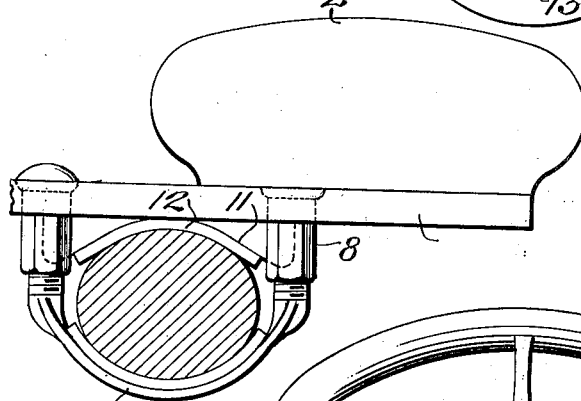
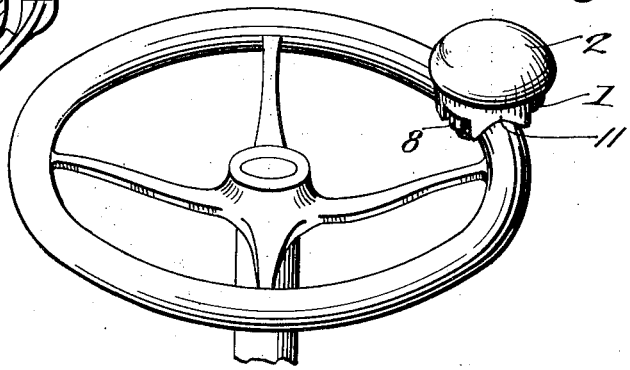
Inventor:-
Jack Van H. Whipple
by his Attorneys.
Howson & Howson Patented Jan. 11, 1927.

1,614,417

UNITED STATES PATENT OFFICE.

JACK VAN H. WHIPPLE, OF LEONIA, NEW JERSEY.

AUXILIARY HAND GRIP FOR STEERING WHEELS.

Application filed January 9, 1926. Serial No. 80,209.

The principal object of this invention is to provide a novel and improved form of knob, preferably in the nature of an attachment for the steering wheels of automobiles, the knob being adapted to be secured to the wheel or to one of the spokes of the wheel and to project upwardly out of the plane of the latter so as to afford a grip for the hand of a driver such that he may rotate the wheel through any number of degrees without releasing his hold or causing his hand or arm to assume a strained position.

A more specific object of the invention is to provide a knob of the stated type which shall have a top surface smooth and continuous and of such nature as to present a good appearance and a comfortable contacting surface for the hand.

Another object of the invention is to provide a novel and improved resilient connection between the radial knob and the relatively fixed parts of the device, preventing rattling due to play between these parts.

A still further object of the invention is found in a multiple point contact between the knob device and the wheel to which it is attached which renders the device efficiently attachable to wheels of different diameter of rim and also compensating for corrugations or other irregular contours in the part to which the knob is attached.

A still further object of the invention is to provide a means for connecting the knob to the wheel, such as by the efficient use of friction to eliminate the requirement for screws or other elements tending to mar the wheel, the invention also contemplating the use of a yielding friction surface interposed between the rigid parts of the knob connecting means and the wheel.

A still further object of the invention is to provide a means for securing the knob to the rim including elements underlying or passing around the rim of the wheel and so formed and attached to the other parts of the knob structure as to present no shoulders or projecting parts on the under side of the rim tending to catch the clothes of one operating the car, and providing an entirely smooth surface extending on the under side of the rim. In this respect, the invention contemplates the use of blind nuts in conjunction with a substantially U-shaped knob retaining member whereby the projecting or threaded ends of the latter member are passed into nuts, which latter occupy a position well above the under side of the wheel rim.

The invention also contemplates the use of a spherical seat for the aforesaid nuts, such that the latter are self-adjustable whereby an absolute accuracy in the dimensions of the various parts is rendered unnecessary.

The invention also suggests the use of a flexible rim encircling band constituting a retaining strap for the knob, which band by reason of its flexibility will assume the shape of the wheel rim.

The invention also contemplates in a modified form the use of a knob construction affording a radial offset of the knob when attached to the wheel rim, this offset increasing the leverage of the knob on the wheel and materially facilitating the wheel-turning operation.

These and other useful ends I have accomplished by means of the construction illustrated in the attached drawings, in which:

Figure 1 is a transverse section through a knob made in accordance with my invention illustrating it as attached to a wheel rim;

Fig. 2 is a side elevation of the same;

Fig. 3 is a view in perspective illustrating the knob attached to the rim, and

Fig. 4 is a side view of a modified form of knob by means of which an increased leverage on the wheel may be obtained.

Referring to the drawings, the knob comprises a body portion 1 preferably of die cast aluminum alloy shaped as clearly illustrated in Figs. 1 and 2. This body portion preferably has a flat circular upper surface conforming in shape and size to the under surface of the handle grip portion 2 of the knob, which may be of any desired form and which is secured to the body 1 by means of a screw 3, see Fig. 1, which extends upwardly through a central aperture in the body 1 and into a knurled metal insert 4 securely set in a suitable recess in the under side of the knob. This insert 4 preferably extends in a portion of reduced diameter 5 below the bottom surface of the knob, and this part 5 fits more or less snugly into the aforesaid aperture in the body 1, as clearly illustrated.

In order to provide for a free rotation of the knob on the body, the portion 5 is of greater thickness than the body 1 in that portion through which it extends, and in order to prevent rattling of the knob and too much freedom of play resulting in an annoying noise, I insert between the screw 3 and the under side of the extension 5 a spring 6 which when the screw 3 is turned up tight in the insert 4 is flexed upwardly by reason of a shoulder $6^a$ upon which the ends of the spring seat and exerts a downward pressure upon the screw head which is transferred to the knob through the insert 4 in which the screw is threaded. This spring accordingly tends to hold the knob snugly down against the upper surface of the body and prevents rattling between these parts.

The body 1 also carries in transverse alignment with the aperture 5 a pair of recessed or counterbored openings 7 for the reception of nuts 8. 8, these nuts being introduced into the apertures from the top of the body and being suspended by their extended heads in the counterbores. Preferably the apertures are counterbored at the top so as to provide spherical seats for the correspondingly formed heads 9 of the nuts, and below these seats the openings 7 which extend through the flanges are tapered outwardly to afford a slight play for the nuts so that the latter may adjust themselves cn the spherical seats, for a purpose hereinafter described.

As the means for retaining the knob securely on the wheel, I employ in conjunction with the nuts 8, 8, a U bolt 10 which with its threaded ends engaged by the nuts 8, 8, is adapted to extend underneath and around the rim or spoke to which the knob may be attached. It will now be apparent that the spherical seats 4 and the self-adjusting characteristics of the nuts 8, 8, as previously described, give allowance for slight errors in the dimensions of the U bolt and prevent binding due to such dimensional error. This device insures a free movement of the nuts in tightening up the U bolt and relieves the parts of strain due to a possible poor fit between the nuts and the U bolt.

It will be noted that the body part 1 is formed at either end with a recess 11 into which the rim or spoke, as the case may be, fits, this recess being in the nature of a socket for the part to which the knob is attached. In order to prevent marring of the wheel parts by contact with the under side of the body and the bolt 10, I preferably provide pads 12 and 13 adapted to fit between the rim and the body and between the rim and the U bolt, as clearly illustrated. This pad may be of felt, leather or any soft or resilient material.

In Fig. 4 I have illustrated a modification of the device in which the body part 1 is extended so that the clamp 10, instead of lying directly below the knob, is offset transversely therefrom by reason of the fact that the clamp is at one end of the extended body portion, while the knob is at the opposite end, that portion of the body which engages the rim and the means for clamping the body to the wheel being in all essential respects the same as in the embodiment previously described. In this instance, however, instead of employing a U bolt which is round, I employ one which between the cylindrical threaded end sections takes the form of a flat flexible strap, which by reason of its flexibility will conform closely to the shape of the part of the wheel which it embraces. In this embodiment also, the method of attaching the knob to the body 1 may be identical with that previously described. This embodiment is intended to be attached with the body extending radially outwardly from the rim, and the effect obtained is one of increased leverage rendering the operation of the wheel easier than where the knob is attached to the rim or to one of the spokes inside the rim.

It will be noted that the aforedescribed construction provides for certain highly advantageous characteristics in the knob. By securing the knob to the body by means located near the base of the former, and preferably in the under side of the knob, the entire outer or exposed surface of the knob is left smooth and unbroken, thereby not only affording a highly satisfactory appearance but also providing an absolutely smooth and satisfactory grip for the hand. The material advantage of the spring tensioning means will be apparent, since it precludes possibility of annoying rattles between the knob and the body. It will also be noted that I have provided what in effect is a three-point contact between the knob structure and the part to which it may be secured. This three-point contact is effected by forming the body portion with two separate points of contact with the rim, this contact as previously described being in the recesses 11 at each end of the body and by employing the U bolt connection intermediate the points of contact between the rim and the body. This construction is of considerable importance by reason of the wide variations in the form of the rims of automobile steering wheels and the necessity that the knob be capable of attachment to any rim regardless of its form. In some instances, the rim of the wheel for example is corrugated, and this three-point contact insures a snug fit between the knob structure and the rim regardless of the general shape of the latter.

A considerable improvement is also obtained in the use of fastening means which will not mar the finish of the wheel to which it is attached, nor require the use of boring tools or the like. As previously described, the U bolt embraces the wheel, and protective pads may be placed at each of the three points of contact between the wheel and the knob parts. This not only insures preservation of the wheel in its original state by eliminating fastening means which pass through the rim, but the wheel is not weakened, and if anything reinforced and made stronger by the knob. It will further be noted that by employing the U bolt and nut construction previously described and illustrated in the drawings, the fastening means are positioned entirely above the bottom of the rim, there being no bolts or similar protrusions extending below the under surface of the rim to catch and tear the clothing of the driver, and the U bolt or strap presenting an entirely smooth surface on the under side of the rim.

A considerable advantage is also realized in the self-adjusting nature of the bolts, this insuring the entire freedom of movement of the bolts in the tightening operation regardless of slight errors in the dimensions of the U bolt and preventing binding of the parts with consequent strains in the knob structure.

It will be understood that the device is capable of some modification without departure from the essential features of the invention.

I claim:

1. In an auxiliary handle grip for vehicle steering wheels, the combination with a body, of means for securing the body to the wheel, a knob rotatably secured to the body, and resilient means for preventing uncontrolled relative movement between the knob and the body.

2. In an auxiliary handle grip for vehicle steering wheels, the combination with a body part, of means for securing said body to the wheel, a knob rotatably secured on the body, and a spring engaging the body and operatively connected with the knob to maintain the knob in close engagement with the body.

3. In an auxiliary handle grip for vehicle steering wheels, the combination with a body, of means for securing the body to the wheel, a knob, an element extending from the knob and rotatably secured in the body, and a spring operatively connected with said element and exerting thereon a pressure tending to retain the knob closely against the body.

4. In an auxiliary handle grip for vehicle steering wheels, the combination with a body part, of means for securing the body to the wheel, said body having an aperture therein, a knob adapted to seat upon the body and having a central cylindrical extension adapted to project through said aperture, an element secured in the said extension and engaging the under side of the body to prevent withdrawal of the knob, and a spring engaging the body and said element and exerting a pressure tending to retain the knob closely against its seat upon the body.

5. In an auxiliary handle grip for vehicle steering wheels, the combination with a body part, of means for securing the body to the wheel, a knob, and means confined to the base of the knob for securing the knob rotatably and resiliently to the body.

6. In an auxiliary handle grip for vehicle steering wheels, the combination with a body part, of a knob secured to the body, a substantially U-shaped rim-embracing member, and means for securing said member at its extremities to the body, said securing means at at least one end of the member including threads on the member, and a correspondingly threaded element rotatably mounted in the body and cooperating with said threaded part of the rim-embracing member to draw the member and body together to securely grip the rim therebetween.

7. In an auxiliary handle grip for vehicle steering wheels, the combination with a body, of a knob rotatably mounted on the body, a pair of nuts rotatably mounted in the body and projecting from the under side thereof, and a substantially U-shaped clamp adapted to embrace that part of the wheel to which the knob is attached and having threaded ends engaged by said nuts.

8. In an auxiliary handle grip for vehicle steering wheels, the combination with a body, of a knob rotatably mounted on the body, a securing element secured at one end to the body and adapted to embrace that part of the wheel to which the knob is attached, means for securing the other end of the securing element to the body including a nut rotatably mounted in the body and adapted to engage the threaded end of said element, and means providing for limited self-adjustment of the nut into alignment with the axis of the threaded end of said element.

9. In an auxiliary handle grip for vehicle steering wheels, the combination with a body, of a knob rotatably mounted on the body, an element adapted to embrace that part of the wheel to which the body is attached, and means for securing said element to the body including a nut rotatably mounted in the body, said body having a spherical seat for said nut adapting it for adjustment into alignment with that end of the embracing element which it engages.

10. In an auxiliary handle grip for vehicle steering wheels, the combination with a body having a pair of spaced spherical seats, of a nut mounted on each of said seats and freely rotatable in the body, a U-shaped clamping member having threaded ends for engagement with said nuts, and a knob secured to the body.

11. In an auxiliary handle grip for vehicle steering wheels, the combination with a body having an enlargement at each end, each of said enlargements being recessed on the under side, a substantially U-shaped retaining member detachably secured to the under side of the body intermediate said enlarged ends, and a knob mounted on the upper side of said body.

12. In an auxiliary handle grip for vehicle steering wheels, the combination with a body part, of a knob rotatably secured on the body, means for securing the body to the wheel including an element having threaded engagement with the body and between which and the body a part of the wheel is confined, and means providing for self-alignment of the interengaging threaded parts on the body and said element.

13. In an auxiliary handle grip for vehicle steering wheels, the combination with a body, of means attached to said body intermediate the ends for securing the body to the wheel, said body being adapted to contact with the wheel at segregated points respectively on opposite sides of said retaining means, and a knob secured to the body.

14. In an auxiliary handle grip for vehicle steering wheels, the combination with a body, of a knob mounted on said body, means for clamping said body to the rim including an element adapted with the body member to encircle that part of the wheel to which the body is attached, and resilient lining elements adapted for insertion between the wheel and the contacting parts of the knob structure.

15. In an auxiliary handle grip for vehicle steering wheels, the combination with an extended body portion having at one end means for attaching the body to the wheel, of a knob mounted on said body so as to project therefrom in a direction substantially at right angles to the plane of the rim of said wheel and being arranged at the opposite end of said body from the said attaching means whereby the knob is offset radially from the rim of the wheel.

16. In an auxiliary handle grip for vehicle steering wheels, the combination with a body, of a knob mounted on said body, and means for securing the body to the wheel including a member for embracing that part of the wheel to which the body is attached, said body being formed to contact with the wheel at segregated points only and the embracing member being positioned intermediate said points of contact.

JACK VAN H. WHIPPLE.